United States Patent [19]

Sieben

[11] Patent Number: 5,436,782

[45] Date of Patent: Jul. 25, 1995

[54] MAGNETIC-TAPE CASSETTE AND REEL-LOCKING DEVICE SUITABLE FOR USE IN THE MAGNETIC-TAPE CASSETTE

[75] Inventor: Joannes H. F. C. Sieben, Eindhoven, Netherlands

[73] Assignee: U.S. Philips Corporation, New York, N.Y.

[21] Appl. No.: 65,083

[22] Filed: May 20, 1993

[30] Foreign Application Priority Data

Jul. 13, 1992 [EP] European Pat. Off. ............ 92202133

[51] Int. Cl.⁶ .......................................... G11B 23/087
[52] U.S. Cl. .................................. 360/132; 242/338.1; 242/338.3
[58] Field of Search ................. 360/132, 131; 242/197, 242/198, 199, 338.1, 338.3

[56] References Cited

U.S. PATENT DOCUMENTS

| | | | |
|---|---|---|---|
| 4,309,002 | 1/1982 | Saitou et al. | 242/198 |
| 4,736,903 | 4/1988 | Landry et al. | 242/198 |
| 4,789,113 | 12/1988 | Katagiri et al. | 242/198 |
| 4,801,107 | 1/1989 | Dixon et al. | 242/199 |

FOREIGN PATENT DOCUMENTS

| | | |
|---|---|---|
| 0070616 | 1/1983 | European Pat. Off. . |
| 0325664 | 8/1989 | European Pat. Off. . |
| 0478057 | 4/1992 | European Pat. Off. . |
| 58-199480 | 11/1983 | Japan . |
| 60-106086 | 6/1985 | Japan . |
| 60-182579 | 9/1985 | Japan . |

*Primary Examiner*—Robert S. Tupper
*Assistant Examiner*—William R. Korzuch
*Attorney, Agent, or Firm*—Brian J. Wieghaus

[57] ABSTRACT

A magnetic-tape cassette includes a reel locking device having tow levers each having one tooth. The levers further comprise actuating members which can be pushed away by a release pin provided on a drive spindle of an apparatus, so that the levers are movable between a locking position, in which the teeth are in engagement with a toothed surface provided in the magnetic-tape cassette, and a released position, in which the teeth are not in engagement with the toothed surface. The teeth are then movable in a direction substantially parallel to the main walls of the magnetic-tape cassette.

7 Claims, 4 Drawing Sheets

MAGNETIC-TAPE CASSETTE AND REEL-LOCKING DEVICE SUITABLE FOR USE IN THE MAGNETIC-TAPE CASSETTE

The invention relates to a magnetic-tape cassette having a housing with a first main wall and, parallel thereto, a second main wall. The first main wall has a reel-drive opening, a reel having a central hole concentric with the reel-drive opening, and a reel locking device with (i) a support having at least one tooth and (ii) an actuating member situated in the hole in the reel, which support is movable between a locking position, in which the tooth is in engagement with a toothed surface provided in the magnetic-tape cassette, and a released position, in which the tooth is not in engagement with the toothed surface.

A magnetic-tape cassette of the type defined in the opening paragraph is known from EP 0,070,616 A1. The reel-locking device disclosed therein comprises a toothed support which can be translated perpendicularly to the main walls and whose teeth can mesh with teeth provided on the reel. This means that for bringing the support into a released position, in which the teeth of the support are disengaged from the teeth of the reel, the support should be moved in a direction perpendicular to the main walls and against a spring force. Such a reel locking device is used to prevent the magnetic tape from being inadvertently unwound from the reel and to preclude rattling of the reel inside the housing. In order to prevent the reel from rattling inside the housing as a result of backlash of the teeth or as a result of disengagement of the teeth when the magnetic-tape cassette is jolted, it is desirable that the teeth are biased to ensure that they intermesh. In the known magnetic-tape cassette such a bias results in a force being exerted on the housing in a direction perpendicular to the main walls. The housing must be reinforced in order to keep the deformation of the housing caused by these bias forces within limits.

In magnetic-tape cassettes in which the reels do not comprise flanges, foils are interposed between the reel and the main walls to guide the edges of the magnetic tape in order to ensure that the magnetic tape is wound correctly onto the reels. These foils between the reel and the main walls are deformed as a result of the bias force, which is detrimental to a satisfactory performance of the foils.

During cooperation with a magnetic-tape apparatus the magnetic-tape cassette is positioned in the apparatus. This is effected by pressing positioning surfaces of the magnetic-tape cassette against further positioning surfaces provided in the apparatus. With the known magnetic-tape cassette the force which occurs as a result of the displacement of the support against the spring force will counteract the pressure necessary to position the magnetic-tape cassette, so that for an accurate positioning of the magnetic-tape cassette a larger pressure is needed than with a magnetic-tape cassette without such a reel-locking device. As a result of this larger pressure the magnetic-tape cassette is deformed more strongly, which is undesirable, inter alia in view of an increased friction between the reels and the magnetic-tape guiding foil in the magnetic-tape cassette.

SUMMARY OF THE INVENTION

It is an object of the invention to provide a magnetic-tape cassette of the type defined in the opening paragraph, in which at least in the released position of the reel locking device the forces exerted on the magnetic-tape cassette in a direction perpendicular to the main walls are smaller than with the known magnetic-tape cassette. To this end, the magnetic-tape cassette in accordance with the invention is characterized in that the tooth is movable in a direction substantially parallel to the main walls. Therefore, the spring force against which the tooth should be moved to bring the support into its released position and the bias force which may be provided to keep the tooth in mesh with the toothed surface act in a substantially radial direction. As a result, smaller forces are exerted on the housing in a direction perpendicular to the main walls. In order to bring and keep the reel-locking device in the released position the force exerted on this magnetic-tape cassette in a direction perpendicular to the main walls is smaller than with the known magnetic-tape cassette.

An embodiment of the magnetic-tape cassette in accordance with the invention is characterized in that the toothed surface is an externally toothed surface provided on a circular ridge which is concentric with the reel-drive opening and which is situated on an inner side of one of the main walls, and the support is movably secured to the reel. The reel locking device is thus integrated with the housing and the reel and consequently it does not comprise any loose parts. As a result of this, no additional steps are required during assembly of the magnetic-tape cassette.

In order to enable the reel to be released by a release pin provided in an apparatus, a favorable embodiment of the magnetic-tape cassette in accordance with the invention is characterized in that the support is formed by a lever which is disposed in a plane parallel to the main walls and which comprises two arms extending at least substantially perpendicularly to one another and carrying the tooth at one end.

A further favorable embodiment of the magnetic-tape cassette in accordance with the invention is characterized in that with its other end the lever is pivotably connected to an inner bounding wall of the hole in the reel, and the actuating member is arranged near the junction between the two arms near the center of the reel.

Another embodiment of the magnetic-tape cassette in accordance with the invention is characterized in that the toothed surface is formed by providing internal teeth on a bounding wall of the hole in the reel, and the support is movably connected to a supporting disc. As a result of this, the housing need not be provided with any parts of the reel locking device, so that no requirements are imposed on the housing and the reel locking device can be used in any existing housing construction.

In order to enable the reel to be released by a release pin provided in an apparatus a favor embodiment of the magnetic-tape cassette in accordance with the invention is characterized in that the support is formed by a lever disposed in a plane perpendicular to the main walls and comprising two arms extending at least substantially perpendicularly to one another and carrying the tooth at one end.

A further favourable embodiment of the magnetic-tape cassette in accordance with the invention is characterized in that the lever is pivotable near the junction between the two arms and the actuating member is situated at the other end of the lever near the center of the reel.

A further embodiment of the magnetic-tape cassette in accordance with the invention is characterized in that the reel locking device and the supporting disc are together bent from one sheet-metal pan. As a result of this, the reel locking device can be manufactured cheaply and can be mounted simply in the magnetic-tape cassette.

Yet a further embodiment of the magnetic-tape cassette in accordance with the invention is characterized in that the reel locking device comprises at least one further support having at least one further tooth and one further actuating member. When the further tooth engages with the toothed surface at a location diametrically opposite the other tooth the reel is prevented from being rotated even in the case of severe shocks because in the case that one of the teeth should become disengaged from the toothed surface upon a displacement of the reel owing to a shock the other tooth will engage the toothed surface even more closely. This ensures that at least one tooth always interlocks with the toothed surface.

The invention also relates to a reel locking device suitable for use in a magnetic-tape cassette in accordance with the invention.

BRIEF DESCRIPTION OF THE DRAWINGS

The invention will now be described in more detail, by way of example, with reference to the drawings. In the drawings.

DESCRIPTION OF THE PREFERRED EMBODIMENTS

Figure 1:
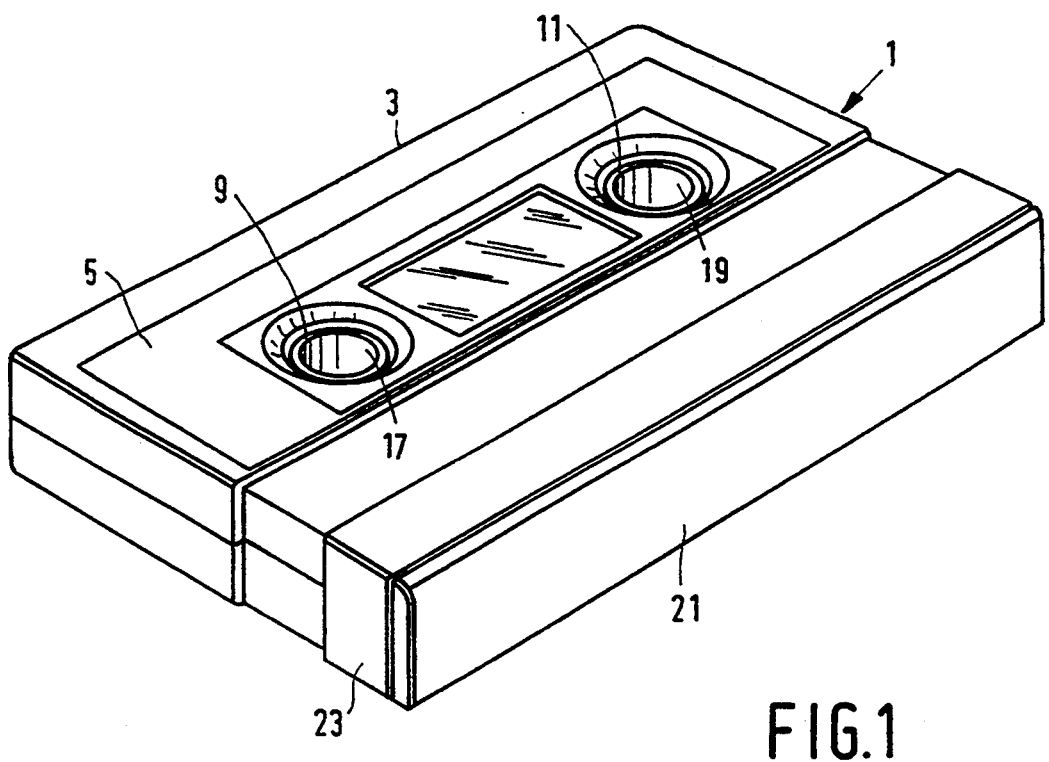
FIG. 1 is a perspective view of an embodiment of the magnetic-tape cassette in accordance with the invention.
Figure 2:
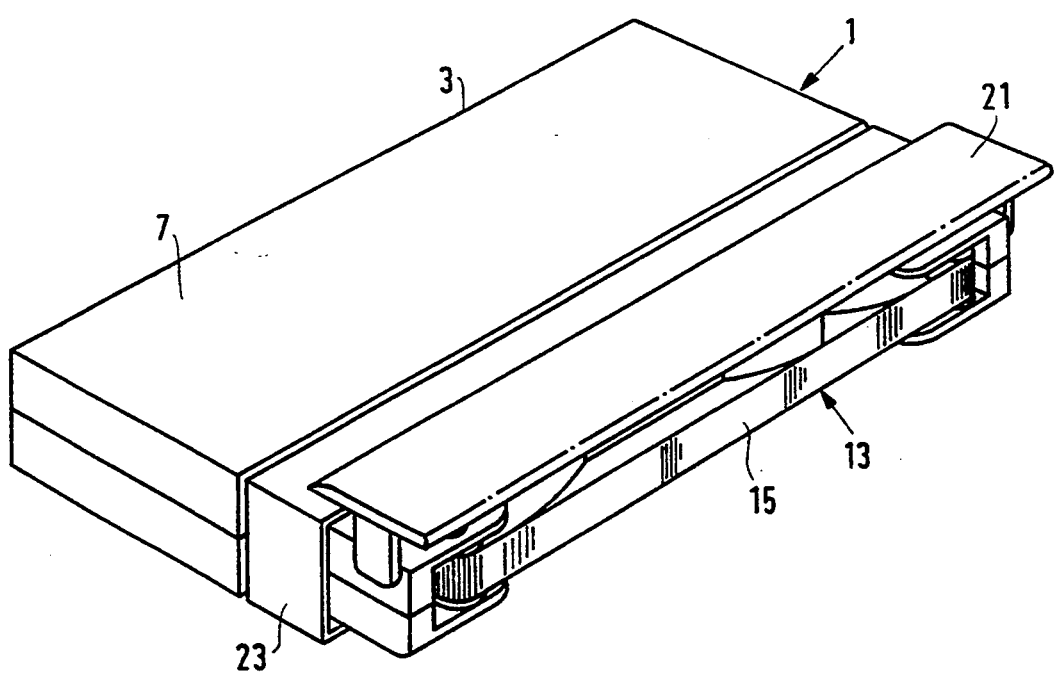
FIG. 2 shows the magnetic-tape cassette viewed at the second main wall with the shutter and the sleeve in the open position.

FIG. 1 is a perspective view showing an embodiment of the magnetic-tape cassette 1 in accordance with the invention. The magnetic-tape cassette has a housing 3 having a first main wall 5 and, parallel thereto, a second main wall 7. The housing 3 accommodates two reels 9, 11 and a magnetic tape 13 wound partly onto the reels and having a part 15 which extends along a front side of the housing 3. FIG. 2 shows the magnetic-tape cassette 1 viewed at the second main wall 7 and with the shutter 21 and sleeve 23 in the open position.

Figure 3:
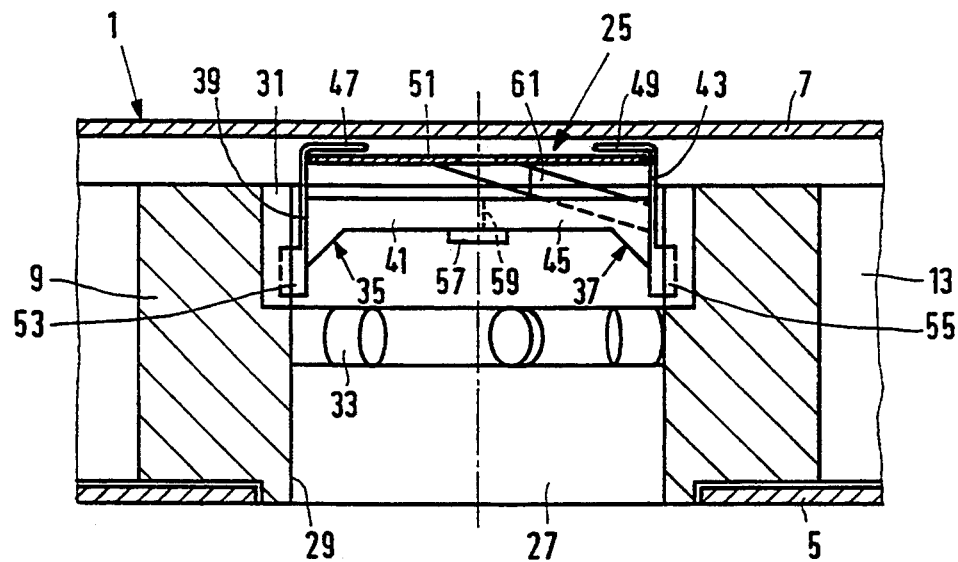
FIG. 3 is a sectional view taken at the location of a reel and showing the magnetic-tape cassette comprising a first embodiment of the reel locking device.
Figure 4:
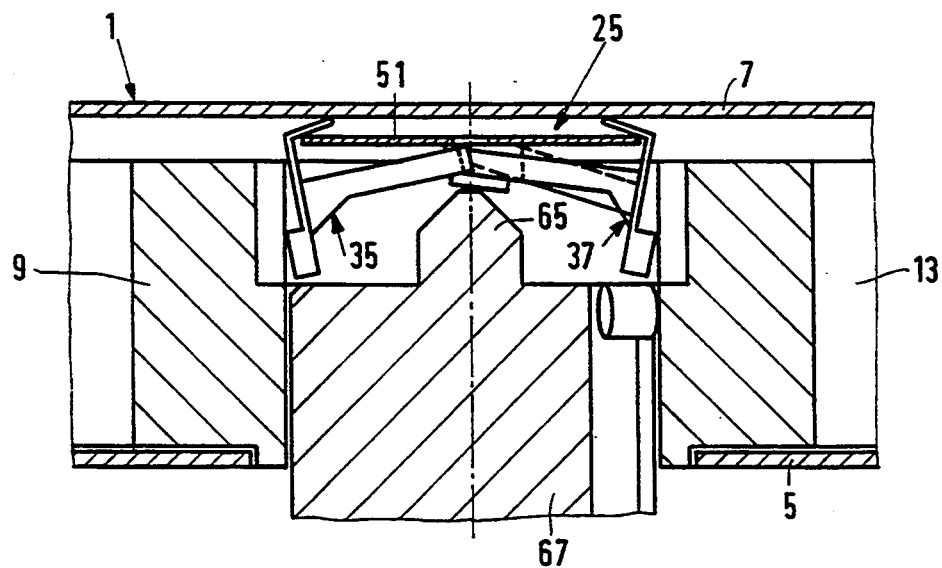
FIG. 4 shows the magnetic-tape cassette during co-operation with a drive spindle of an apparatus.

In order to prevent the magnetic tape from being wound inadvertently off the reels when the magnetic-tape cassette is outside an apparatus, the magnetic-tape cassette comprises a reel locking device 25. FIG. 3 is a sectional view taken at the location of one of the reels 9 and showing the magnetic-tape cassette 1 comprising a first embodiment of the reel locking device 25. The reel 9 has a circularly cylindrical central hole 27. A bounding wall 29 of the hole 27 has internal teeth 31 adapted to cooperate with the reel locking device 25, and projections 33 adapted to cooperate with a drive spindle of an apparatus. The reel locking device 25 comprises two supports each formed by a lever 35, 37 having two mutually perpendicular arms 39, 41; 43, 45. The levers 35, 37 are disposed in a plane perpendicular to the main walls 5, 7. Near the junction between the two arms, the levers 35, 37 each have an offset portion 47, 49 which engages behind a supporting disc 51 of the reel locking device 25, so that the levers 35, 37 are pivotable about an edge of the supporting disc 51. At one end each lever has a tooth 53, 55 formed by an offset sheet-metal portion of the lever (see also FIG. 6) and engaging with the internal teeth 31 of the reel 9. At the other end each lever has an actuating member 57, 59 which is also constituted by an offset sheet-metal portion of the lever and which is situated at the location of the center of the reel 9. Each lever 35, 37 is connected to the supporting disc 51 via a blade spring 61, 63. In the non-loaded or slightly pre-loaded condition of the blade springs the teeth 53, 55 engage with the internal teeth 31, which is illustrated in FIG. 3. If the actuating members 57, 59 are pushed away by a release pin 65 of an apparatus (see FIG. 4) the levers 35, 37 are pivoted about the edge of the supporting disc 51, as a result of which the teeth 53, 55 disengage from the internal teeth 31. This is effected in opposition to the spring force of the blade springs 61, 63. The blade springs 61, 63 are then bent and twisted since they are connected obliquely to the levers 35, 37 and the supporting disc 51, as is clearly shown on FIG. 6. The release pin 65 is preferably arranged on a drive spindle 67 of an apparatus.

Figure 5:
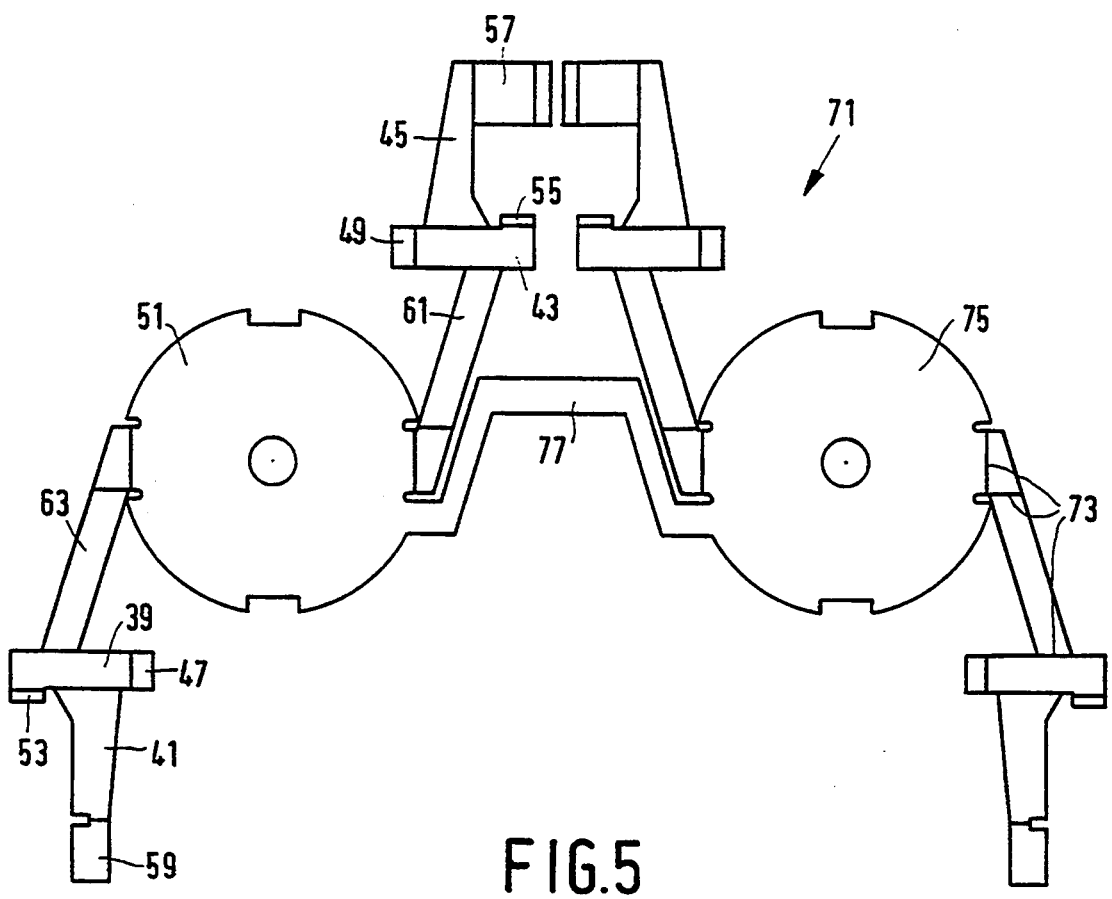
FIG. 5 shows a sheet-metal part from which two reel locking devices can be formed.
Figure 6:
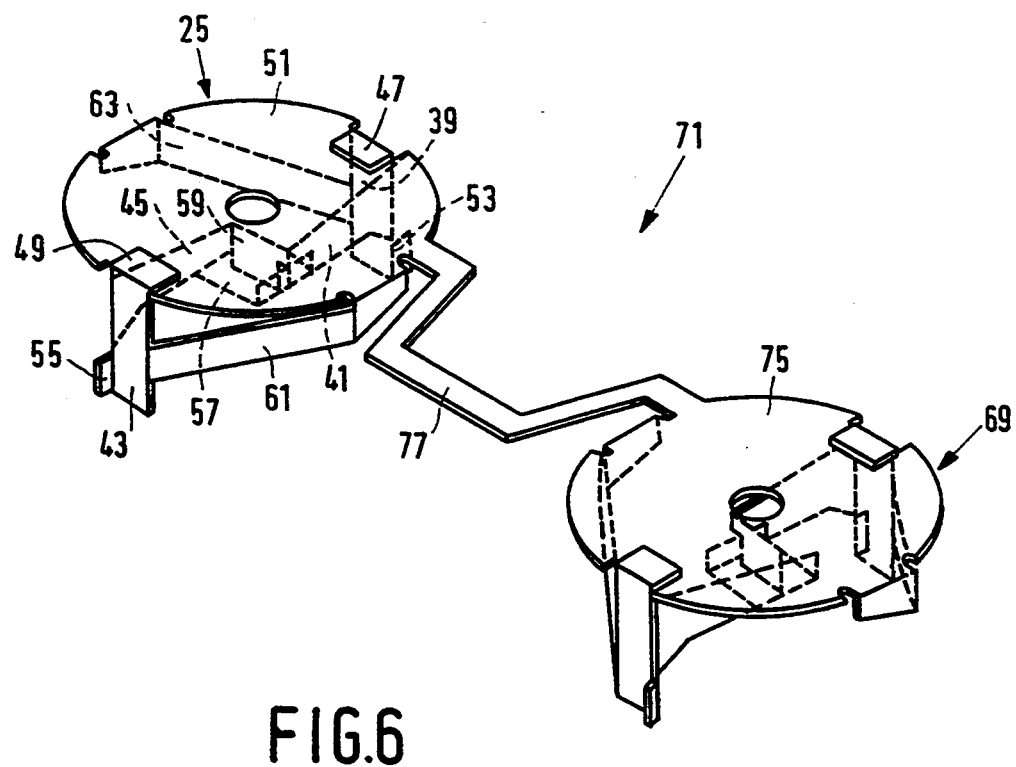
FIG. 6 shows the reel locking devices formed from a single sheet-metal part.

For the other reel the magnetic-tape cassette also has a similar reel locking device 69. The two reel locking devices together with the supporting discs have been bent from a sheet-metal part 71. This sheet-metal part prior to bending is shown in FIG. 5, in which bending lines 73 have been indicated. FIG. 6 shows the sheet-metal part 71 after bending. The two supporting discs 51, 75 are interconnected by a strip 77, so that the reel locking devices 25, 69 cannot rotate along with the reels.

Figure 7:
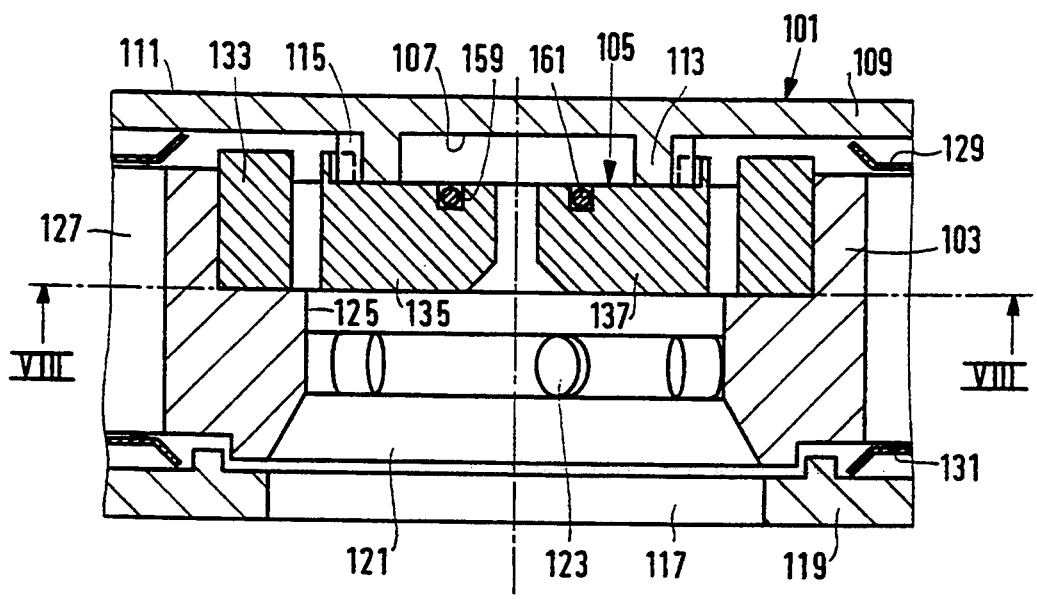
FIG. 7 is a sectional view taken at the location of a reel and showing a second embodiment of the magnetic-tape cassette comprising a second embodiment of the reel locking device.
Figure 8:
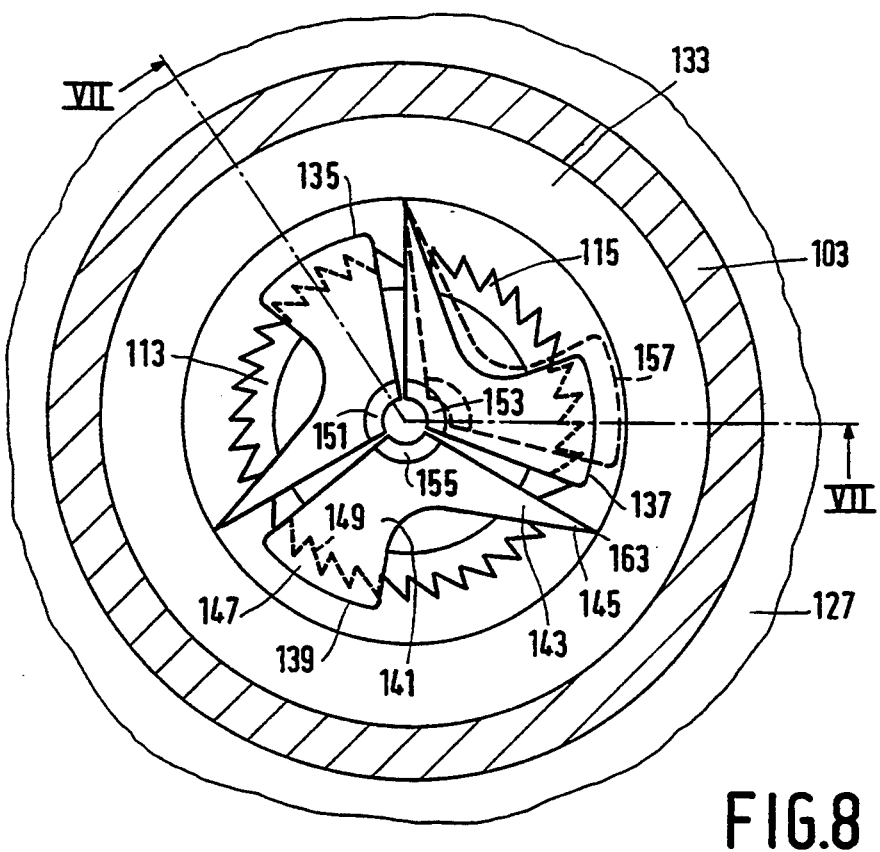
FIG. 8 shows the magnetic-tape cassette in a section view taken parallel to the main wall.

FIG. 7 is a sectional view taken at the location of one of the reels 103 and showing a second embodiment of the magnetic-tape cassette 101 comprising a second embodiment of the reel locking device 105. An inner side 107 of a second main wall 109 of a housing 111 of the magnetic-tape cassette 101 carries a circular ridge 113 having external teeth 115. This ridge 113 is concentric with a reel-drive opening 117 formed in a first main wall 119 of the housing 111. The reel 103 has a central hole 121 and projections 123 on a bounding wall 125 of the hole 121 for cooperation with drive spindles of an apparatus. The reel 103 carries a magnetic-tape spool 127 and between the magnetic-tape spool and the main walls 109, 119 foils 129, 131 are interposed for the purpose of guiding the magnetic tape. In the hole 121 in the reel 103 the reel locking device 105 is arranged, which device comprises a ting 133 within which three supports are situated. The supports are formed by levers 135, 137, 139 which each comprise two mutually perpendicular arms 141, 143. The levers each have one end 145 pivotally connected to the ring 133, the other end 147 having teeth 149 which engage with the external teeth 115 on the ridge 113. The levers 135, 137, 139 are disposed in a plane parallel to the main walls 109, 119. The junction between the two arms is situated near the center of the reel 103. Wall portions of the levers near the center of the reel form actuating members 151, 153, 155. If the actuating members are pushed radially outwards by a release pin of an apparatus the teeth 149 become disengaged from the external teeth 115 on the ridge 113, which is indicated by a broken line 157 in FIG. 8, which shows the magnetic-tape cassette in a sectional view taken parallel to the main wall. The levers have a groove 159 in which a spring 161 is arranged. In the non-loaded condition of the spring 161 the teeth 149 engage with the external teeth 115 on the ridge 113. A release pin can push the levers 135, 137, 139 apart against spring force, so that the teeth 149 and the external teeth 115 are disengaged from each other. The levers with the teeth and the ring have been manufactured as a single plastics part, the connections between the ring and the levers being formed by integral hinges 163. Enlarging the cross-section of such a connection reduces the hinging action and causes the levers to be deflected elastically during the actuation by means of the release pin, so that the spring may be dispensed with. The reel and the reel locking device can be manufactured in one piece, for example by injection-moulding.

It is to be noted that although the invention has been described with reference to the drawings this does not imply that the invention is limited to the embodiments shown in the drawings. The invention likewise relates to all embodiments which deviate from those shown in the drawings within the scope defined by the Claims.

I claim:

1. A magnetic tape cassette, comprising:
   a) a housing having a pair of opposing main walls, one of said walls having a reel drive opening and the other of said walls being free of reel drive openings;
   b) a reel rotatably supported in said reel drive opening, said reel having an inner wall defining a central hole concentric with said reel drive opening, said inner wall including a plurality of locking elements thereon; and
   c) a reel locking device for selectively locking said reel against rotation, said reel locking device comprising
      1) a support disc arranged in said central reel hole and extending parallel to and adjacent said main wall not having said reel drive openings,
      2) a pair of opposing levers extending within said central reel hole said levers each having a first arm extending generally perpendicularly to said main walls and having one end pivotable about said support disc and an other end having a locking element engageable with said locking elements of said inner wall, a second arm extending from said first arm generally parallel to said main walls and terminating at a control end near the center of said central hole, means for locking said support disc and lever arms against rotation relative to said housing, said levers being moveable out of a locking position, in which said locking elements on said first arms engage said locking elements on said inner wall of said reel to lock said reel against rotation, and an unlocked position, in which said control ends are moved towards said support disc and said locking elements on said first arm are moved towards each other and disengage from said locking elements on said inner wall, allowing rotation of said reel, and
      3) biasing means for biasing said levers into said locking position.

2. A magnetic tape cassette according to claim 1, wherein said biasing means is comprised by a blade spring extending obliquely between said support disc and said first lever arm.

3. A magnetic tape cassette according to claim 2, comprising two each of said reel drive openings, said reels, and said reel locking devices, and said means for preventing rotation of said support discs is comprised by an arm interconnecting the support discs of each of said two reel locking devices.

4. A magnetic tape cassette according to claim 3, wherein said two reel locking devices and said arm interconnecting said support discs are together comprised by a single sheet metal part.

5. A magnetic tape cassette according to claim 2, wherein said reel locking device is comprised by a single sheet metal part.

6. A magnetic tape cassette according to claim 1, wherein said reel locking device is comprised by a single sheet metal part.

7. A magnetic tape cassette according to claim 1, wherein said locking elements on said inner reel wall are teeth.

* * * * *